(12) United States Patent
Wendeberg et al.

(10) Patent No.: US 8,801,293 B2
(45) Date of Patent: Aug. 12, 2014

(54) MOUNTING SLEEVE FOR MOUNTING A RING MEMBER ON A SHAFT AND A BEARING ASSEMBLY INCORPORATING SUCH A MOUNTING SLEEVE

(75) Inventors: Hans Wendeberg, Vastra Frölunda (SE); Hakan Leander, Torslanda (SE)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 12/922,367

(22) PCT Filed: Mar. 9, 2009

(86) PCT No.: PCT/SE2009/000127
§ 371 (c)(1),
(2), (4) Date: Sep. 13, 2010

(87) PCT Pub. No.: WO2009/113939
PCT Pub. Date: Sep. 17, 2009

(65) Prior Publication Data
US 2011/0013861 A1    Jan. 20, 2011

(30) Foreign Application Priority Data

Mar. 12, 2008  (SE) ........................................ 0800568

(51) Int. Cl.
*F16C 35/063*    (2006.01)

(52) U.S. Cl.
USPC ........................................................ 384/538

(58) Field of Classification Search
USPC ........................... 384/537, 538, 540, 559, 562
See application file for complete search history.

(56) References Cited

U.S. PATENT DOCUMENTS

| | | | | |
|---|---|---|---|---|
| 3,816,013 | A | * | 6/1974 | Schuhmann ................... 403/368 |
| 5,143,456 | A | * | 9/1992 | Jordens et al. ................ 384/275 |
| 5,876,127 | A | * | 3/1999 | Casey ............................ 384/538 |
| 6,857,784 | B2 | * | 2/2005 | DeWachter et al. ........... 384/551 |
| 2005/0225186 | A1 | * | 10/2005 | Laing et al. ...................... 310/90 |
| 2008/0308365 | A1 | * | 12/2008 | Foge et al. ................ 188/251 A |

FOREIGN PATENT DOCUMENTS

| | | |
|---|---|---|
| DE | 10311917 A1 | 10/2004 |
| EP | 0223759 A1 | 5/1987 |
| EP | 0926370 A2 | 6/1999 |
| JP | S53014057 | 5/1978 |
| JP | S60208618 A | 10/1985 |
| JP | 2007016981 A | 1/2007 |
| JP | 2007270966 A | 10/2007 |
| JP | 2007271048 A | 10/2007 |

OTHER PUBLICATIONS

Machine translation of IDS document EP 10311917.*

(Continued)

*Primary Examiner* — Alan B Waits
(74) *Attorney, Agent, or Firm* — Bryan Peckjian; SKF USA Inc. Patent Department

(57) ABSTRACT

The present invention refers to a mounting sleeve (1) for mounting a ring having a tapering inner bore on a cylindrical shaft, wherein the mounting sleeve has a cylindrical inner envelope surface, wherein the inner surface of the mounting sleeve has an increased friction coefficient, for giving an increased ability to the mounting sleeve to transfer axial load, without sliding along the surface of the shaft.

10 Claims, 3 Drawing Sheets

(56) References Cited

OTHER PUBLICATIONS

Envelope. (n.d.). Collins English Dictionary—Complete & Unabridged 10th Edition. Retrieved Jun. 6, 2013, from Dictionary.com website: http://dictionary.reference.com/browse/envelope.*

Tube. (n.d.). Collins English Dictionary—Complete & Unabridged 10th Edition. Retrieved Jun. 6, 2013, from Dictionary.com website: http://dictionary.reference.com/browse/tube.*

Sleeve. (n.d.). Dictionary.com Unabridged. Retrieved Jun. 6, 2013, from Dictionary.com website: http://dictionary.reference.com/browse/sleeve.*

* cited by examiner

MOUNTING SLEEVE FOR MOUNTING A RING MEMBER ON A SHAFT AND A BEARING ASSEMBLY INCORPORATING SUCH A MOUNTING SLEEVE

BACKGROUND OF THE INVENTION

The present invention refers to mounting of ring members on a shaft, and particularly and particularly to a mounting sleeve for mounting a bearing race ring on a shaft in order to give an improved ability of supporting axial load without slipping on the shaft. The invention also refers to a bearing assembly incorporating such a mounting sleeve.

In recent years, the load carrying capacity of rolling bearings has steadily increased due to improvements of internal bearing geometry, heat treatment and materials. As a consequence thereof, it is today possible to use bearings of smaller size for the same load as earlier required larger bearings, or alternatively, bearings of a certain size are today used for higher loads. A commonly used expression for this development is "down-sizing".

As structural elements for fitting rolling bearings on shafts it is often used adapter sleeves, withdrawal sleeves or splined sleeves. All those sleeves are comparatively thin-walled, externally tapering steel sleeves with cylindrical bore and usually having an axially extending slot. For larger bearings, and therefore larger sleeves, the material used is cast iron. By pressing the inner race ring of the bearing up on the sleeve, whereby the inner race ring is subjected to expansion, a contact pressure is created which via friction will keep the bearing ring fixed to the sleeve and the sleeve fixed to the shaft.

When a bearing mounted on a sleeve is used as an axially locating bearing, the sleeve will transfer the axial load via friction between sleeve and shaft. By calculating the contact pressure for a given driving up distance for a specific bearing inner race ring, it is possible by estimating the friction coefficient to calculate which axial load a specific sleeve will be able to carry.

In order to estimate in a more simple manner the ability of the sleeve to support axial forces, it is often in bearing brochures referred to a control calculation, where the maximum axial load $F_{amax}$ is shown as $F_{amax}=3 \times B \times d$ [N], where B is the width of the bearing ring in millimeters, d is the nominal bore diameter of the bearing ring in millimeters, and the digit 3 is a constant (N/mm.sup.2). The constant is chosen as an approximation of the friction coefficient, a typical driving up (expansion) of the bearing inner race ring, the modulus of elasticity for a typical bearing steel and an assumption of a typical ring cross section.

As a smaller bearing (motivated from the down-sizing aspect) has a smaller nominal diameter or smaller width or both, a consequence in this respect is that the ability of the bearing to accommodate axial load is decreasing, i.e. there will be a risk that the bearing inner race ring will be displaced from its position, which is not acceptable for a locating bearing.

As an example and based on an old bearing and the basic capacity thereof, it is for instance found that a spherical roller bearing 23256K, having the dimensions d=280 mm, B=176 mm and D=500 mm, is suited for a certain combination of radial and axial load. For the specific example it is assumed that the axial load is 130 kN. With a new bearing, having a higher basic capacity, it is evident that the smaller bearing 23152K having the dimensions d=260 mm, B=144 mm and D=440 mm, should be satisfactory from load carrying aspects.

The $F_{amax}=3 \times B \times d$ for the older bearing will be 147.8 kN, whereas it for the smaller bearing will be only 112.3 kN, i.e. only 76% of the axial load the sleeve of the larger bearing can carry. Therefore the parameters of the mounting sleeve will be the determining factor, and it should be necessary to increase the size of the bearing depending on the sleeve, which will give a more expensive bearing, and the possibilities of downsizing the bearing assembly will be lost.

A possible manner of compensating this would be to increase the driving up (expansion) of the bearing inner race ring, but this in turn would give the negative consequence of an increase of the ring tension tangentially, resulting in a reduced fatigue endurance for the bearing.

SUMMARY OF THE INVENTION

Therefore a purpose of the present invention is to propose a mounting sleeve increasing the ability to accommodate and transfer axial load, and this has been achieved with a mounting sleeve having a tapering inner bore on a cylindrical shaft, the mounting sleeve comprising a sleeve having an inner cylindrical envelope surface and a friction increasing treatment on the inner surface so as to increase axial loading transferable by the sleeve between the ring and the shaft while remaining generally axially fixed on the shaft.

Another purpose of the present invention is to propose a bearing assembly for a locating bearing incorporating such a mounting sleeve comprising a bearing inner race ring having a tapering bore, an outer race ring, a plurality of rolling bodies arranged between said inner race ring and said outer race ring, and a mounting sleeve configured to mount the bearing inner race ring on a cylindrical shaft, the mounting sleeve having an inner surface with a friction increasing treatment so as to increase axial loading transferable by the sleeve between the inner ring and the shaft while remaining generally axially fixed on the shaft.

Hereinafter the invention will be further described with reference to not limiting embodiments illustrated in the accompanying drawing.

DETAILED DESCRIPTION OF THE INVENTION

Figure 1:
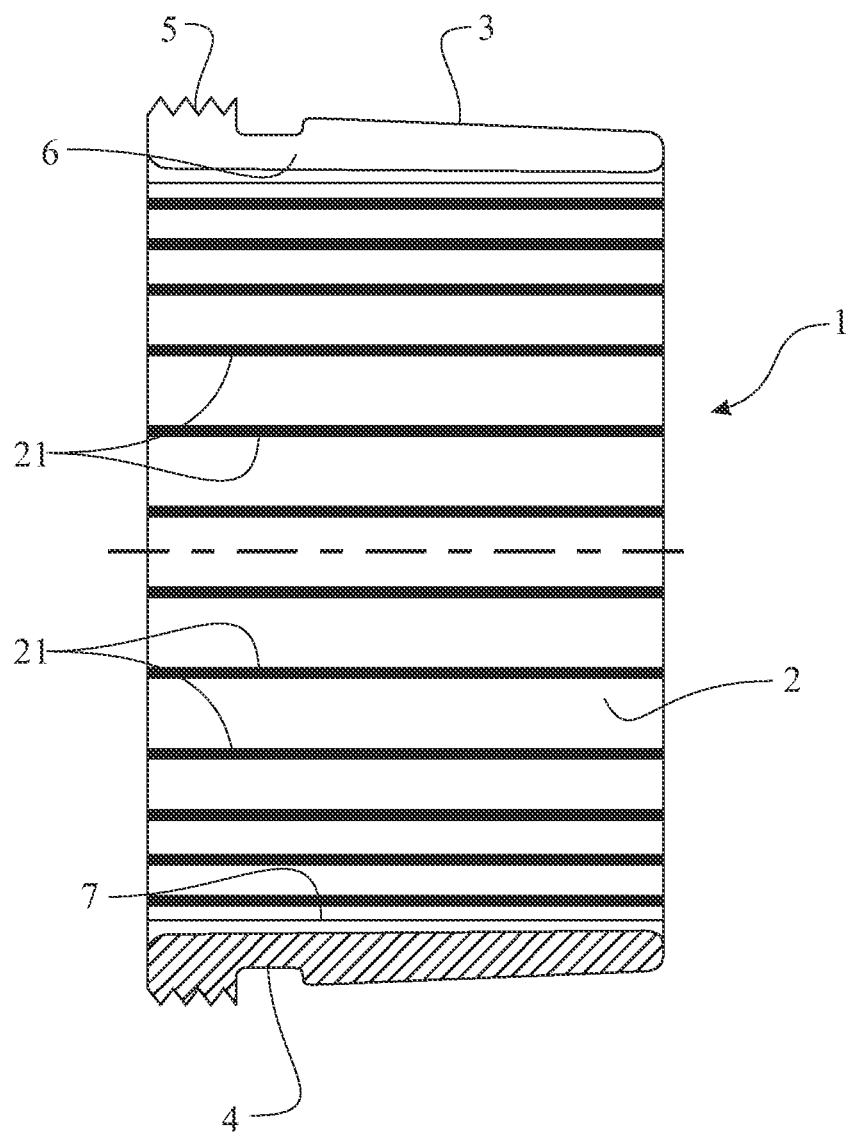
FIG. 1 shows a cross-section of an embodiment of a mounting sleeve according to the invention, designed as a withdrawal sleeve.

FIG. 1 shows a cross-section of a mounting sleeve 1, in this embodiment being designed as a withdrawal sleeve, primarily intended for mounting and dismounting of bearing race rings, even if its use is not limited to mounting of rings for bearings.

The mounting sleeve 1 is thin-walled and has a substantially cylindrical inner envelope surface 2 and a slightly tapering outer envelope surface 3. Adjacent one axial end of the sleeve 1 there is arranged a circumferentially groove 4 and a threaded end portion 5. The sleeve 1 also is provided with an axially extending slot 6.

For increasing the ability to transfer axial force without slipping axially, the inner envelope surface 2 of the sleeve 1 has been subjected to friction increasing treatment in order to increase the $F_{amax}$-value, in spite of reduced contact surface for the inner envelope surface 2 of the mounting sleeve 1 against a (not shown) shaft. For achieving such increased friction, the inner envelope surface 2 of the mounting sleeve 1 in this embodiment is equipped with an internal coating 7 of an appropriate material. This coating can either be arranged to cover the entire inner envelope surface or it can be arranged to be partially applied to this surface. The coating can preferably, but not necessarily be based on a carbide.

The sleeve 1 can be used adapter sleeves, withdrawal sleeves or splined sleeves, wherein the sleeve 1 would include splines 21 for the splined sleeve application. The number, size (height, width, length), shape, and distribution of the splines 21 are only presented for illustrative purposes only and forms no part of the invention.

Figure 2:
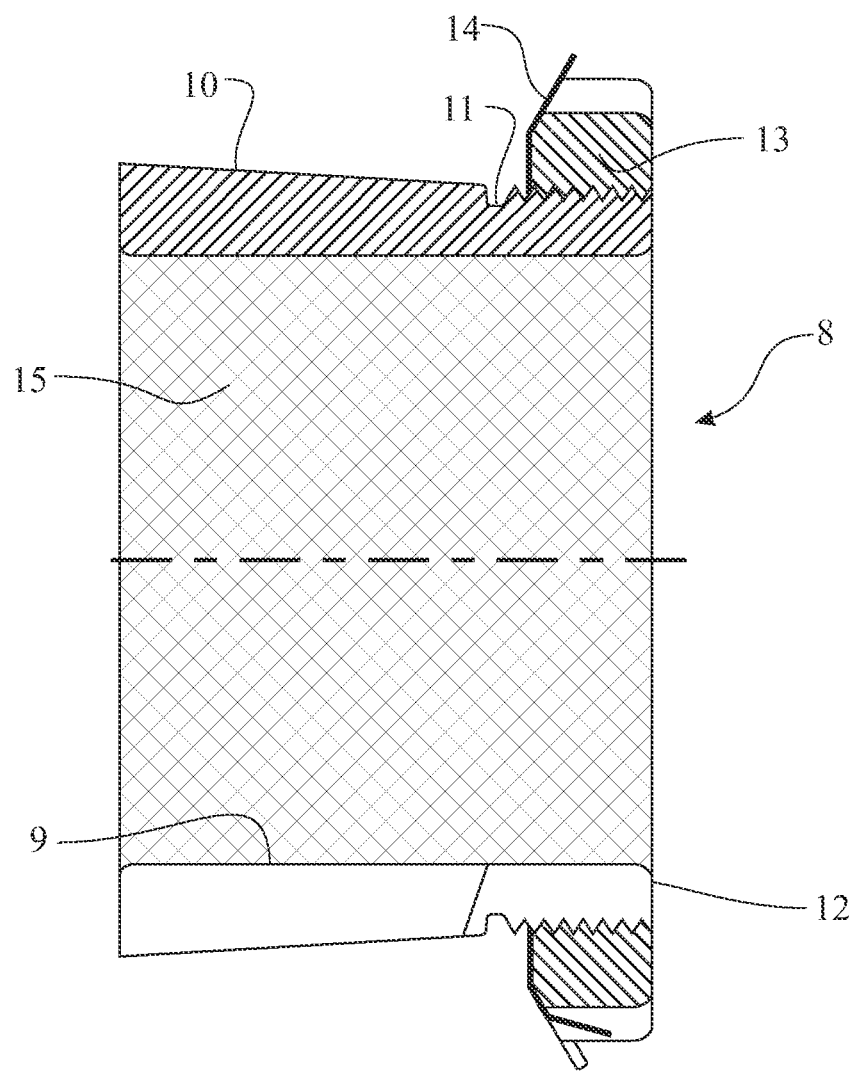
FIG. 2 shows a cross-section of another embodiment of a mounting sleeve according to the invention, designed as an adapter sleeve.

In FIG. 2 is illustrated in cross-section a mounting sleeve in form of an adapter sleeve 8, having a substantially cylindrical inner envelope surface 9, a tapering outer surface 10, with a circumferential groove 11 adjacent one axial end thereof and a threaded portion 12, on which is arranged a lock nut 13 with a locking washer 14.

The inner envelope surface 9 has been provided with a friction increasing topography 15, for instance—but not exclusively—a knurling—such as illustrated. Also in this case the entire inner envelope surface or one or more parts thereof may be equipped with such a friction increasing topography.

Figure 3:
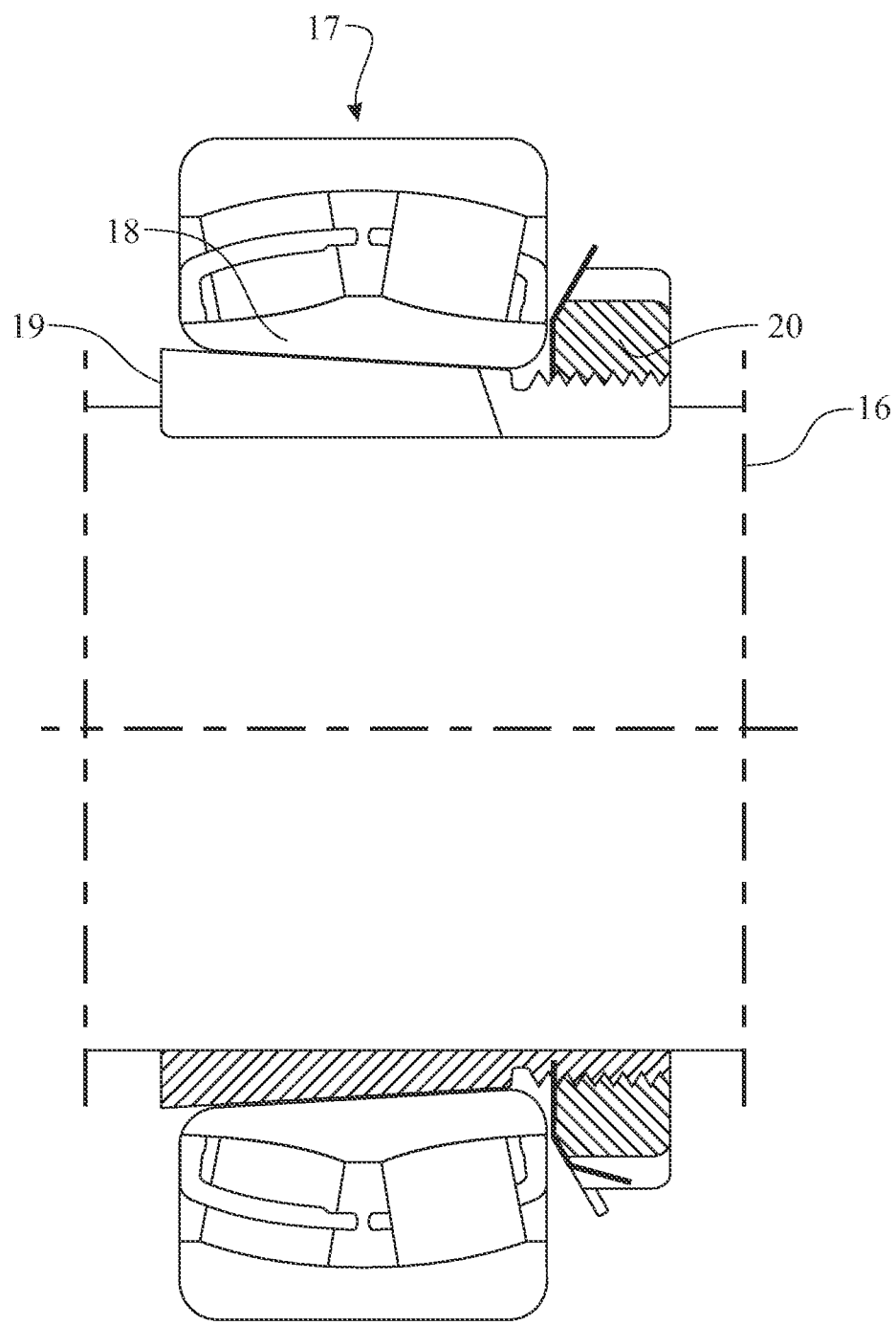
FIG. 3 illustrates a bearing assembly mounted on a shaft via an adapter sleeve according to the invention.

In FIG. 3 is illustrated a bearing assembly, mounted on a substantially cylindrical shaft 16, and incorporating a spherical roller bearing 17, the inner race ring 18 of which has a tapering bore and is arranged to cooperate with the tapering outer envelope surface of a mounting sleeve in form of an adapter sleeve 19 and a lock nut 20, by aid of which the axially locating bearing 17 is arrested in its position on the shaft 16. The mounting sleeve 19 has been treated in any appropriate manner for obtaining an inner envelope surface with increased friction coefficient.

In the embodiments illustrated and described the portion having increased friction is illustrated just as the inner envelope surface of the mounting sleeve, but it is of course possible for instance to apply a coating or other friction increasing measures to the entire mounting sleeve.

The invention is not limited to the embodiments illustrated in the drawings and described with reference thereto but variants and modifications are possible within the scope of the appended claims.

The invention claimed is:

1. A ring and mounting sleeve combination for mounting upon on a shaft,
   said ring comprising a ring body having a tapered inner bore; and
   said mounting sleeve comprising a sleeve body having a tapering outer envelope surface, an inner cylindrical envelope surface, and a series of splines, said inner cylindrical envelope surface comprising a friction increasing treatment applied thereto so as to increase axial loading transferable by said mounting sleeve between said ring and said shaft while remaining axially fixed on said shaft;
   an axial force applicator,
   wherein, said ring and mounting sleeve combination is installed upon said shaft arranging said inner cylindrical envelope surface about said shaft and said ring about said mounting sleeve engaging said tapered inner bore with said tapering outer envelope surface,
   wherein, said axial force applicator drives said ring body in a direction towards a larger diameter of a tapered interface between said ring body and said mounting sleeve resulting in a compression force about a circumference of said sleeve body in a manner where said tapered inner bore generates a compressive force upon said tapering outer envelope surface, said compressive force contracts said inner cylindrical envelope surface,
   wherein friction provided by said friction increasing treatment increases said axial loading upon said cylinder shaft compared to an axial loading generated by said mounting sleeve prior to application of said friction increasing treatment.

2. The ring and mounting sleeve combination for mounting upon on the shaft, as recited in claim 1, said axial force applicator comprises a threaded segment formed on said sleeve body at a location proximate a smaller diameter of said tapered ring body and a mounting sleeve interface; and
   a nut adapted to threadably engage with said sleeve body threaded segment,
   wherein said nut is threadably engaged with said sleeve body threaded segment and said nut drives said ring body in said direction towards said larger diameter of said tapered ring body and said mounting sleeve interface.

3. The ring and mounting sleeve combination for mounting upon on the shaft, as recited in claim 1, wherein said friction increasing treatment is a coating applied to said inner cylindrical envelope surface.

4. The ring and mounting sleeve combination for mounting upon on the shaft, as recited in claim 1, wherein said friction increasing treatment is a friction increasing topography.

5. The ring and mounting sleeve combination for mounting upon on the shaft, as recited in claim 1, wherein said friction increasing treatment is based upon a carbide.

6. A spherical roller bearing and mounting sleeve combination for mounting upon on a shaft,
   said spherical roller bearing comprising an inner race ring having a tapered inner bore, an outer race ring, and a plurality of bearings rotationally assembled therebetween; and
   said mounting sleeve comprising a sleeve body having a tapering outer envelope surface, an inner cylindrical envelope surface, and a series of splines, said inner cylindrical envelope surface comprising a friction increasing treatment applied thereto so as to increase axial loading transferable by said mounting sleeve between said ring and said shaft while remaining axially fixed on said shaft; and
   an axial force applicator,
   wherein, said ring and mounting sleeve combination is installed upon said shaft arranging said inner cylindrical envelope surface about said shaft and said inner race ring about said mounting sleeve engaging said tapered inner bore with said tapering outer envelope surface,
   wherein, said axial force applicator drives said ring body in a direction towards a larger diameter of a tapered interface between said ring body and said mounting sleeve resulting in a compression force about a circumference of said sleeve body in a manner where said tapered inner bore generates a compressive force upon said tapering outer envelope surface, said compressive force contracts said inner cylindrical envelope surface,
   wherein friction provided by said friction increasing treatment increases said axial loading upon said cylinder shaft compared to an axial loading generated by said mounting sleeve prior to application of said friction increasing treatment.

7. The ring and mounting sleeve combination for mounting upon on the shaft, as recited in claim 6, said axial force applicator comprises a threaded segment formed on said sleeve body at a location proximate a smaller diameter of said tapered ring body and a mounting sleeve interface; and a nut adapted to threadably engage with said sleeve body threaded segment, wherein said nut is threadably engaged with said sleeve body threaded segment and said nut drives said ring body in said direction towards said larger diameter of said tapered ring body and said mounting sleeve interface.

8. The ring and mounting sleeve combination for mounting upon on the shaft, as recited in claim 6, wherein said friction increasing treatment is a coating applied to said inner cylindrical envelope surface.

9. The ring and mounting sleeve combination for mounting upon on the shaft, as recited in claim 6, wherein said friction increasing treatment is a friction increasing topography.

10. The ring and mounting sleeve combination for mounting upon on the shaft, as recited in claim 6, wherein said friction increasing treatment is based upon a carbide.

* * * * *